United States Patent [19]

Maes, Jr.

[11] 4,242,833

[45] Jan. 6, 1981

[54] GREENHOUSE AND METHOD OF GROWING PLANTS IN COLD CLIMATES

[75] Inventor: Reed E. Maes, Jr., Ypsilanti, Mich.

[73] Assignee: Environmental Research Institute of Michigan, Ann Arbor, Mich.

[21] Appl. No.: 15,391

[22] Filed: Feb. 26, 1979

[51] Int. Cl.³ .............................................. A01G 9/18
[52] U.S. Cl. ........................................... 47/17; 47/19
[58] Field of Search .............................. 126/417–452; 47/17, 19, 2, 26; 237/1 A; 210/3

[56] References Cited

U.S. PATENT DOCUMENTS

| | | | |
|---|---|---|---|
| 2,777,253 | 1/1957 | Bensin | 47/1 |
| 3,577,678 | 8/1969 | Burton | 47/17 X |
| 3,727,345 | 4/1973 | Smith | 47/2 |
| 4,018,213 | 4/1977 | Mann | 47/17 X |
| 4,108,373 | 8/1978 | Chiapale et al. | 47/17 X |

FOREIGN PATENT DOCUMENTS

| | | | |
|---|---|---|---|
| 223796 | 8/1958 | Australia | 47/17 |
| 281877 | 7/1965 | Australia | 47/17 |
| 2304277 | 11/1976 | France | 47/17 |
| 1144366 | 3/1969 | United Kingdom | 47/2 |
| 1148970 | 4/1969 | United Kingdom | 47/17 |

Primary Examiner—Robert E. Bagwill
Attorney, Agent, or Firm—Krass & Young

[57] ABSTRACT

A greenhouse construction and method of growing plants in cold climates employing a water layer defining in part a growing environment which transmits solar radiation into the interior of an enclosure constituting the growing environment. The water layer acts to absorb longer wavelength infrared portions of the solar spectrum preventing overheating of the greenhouse interior during cold and warm weather seasons, with the resultant heating of the water in the layer allowing it to act as a thermal storage medium during cold weather seasons. At the same time, the water layer transmits the photosynthetic shorter wavelengths of the solar spectrum to support plant growth within the greenhouse. The water layer is disposed in a ceiling structure, consisting of spaced transparent sheet layers combined with a pivotal reflector-insulator panel acting to cover the water layer during nighttime or other periods when solar radiation is absent or minimal. The water in the water layer optionally is circulated through an irrigation system after being warmed by the solar radiation.

8 Claims, 6 Drawing Figures

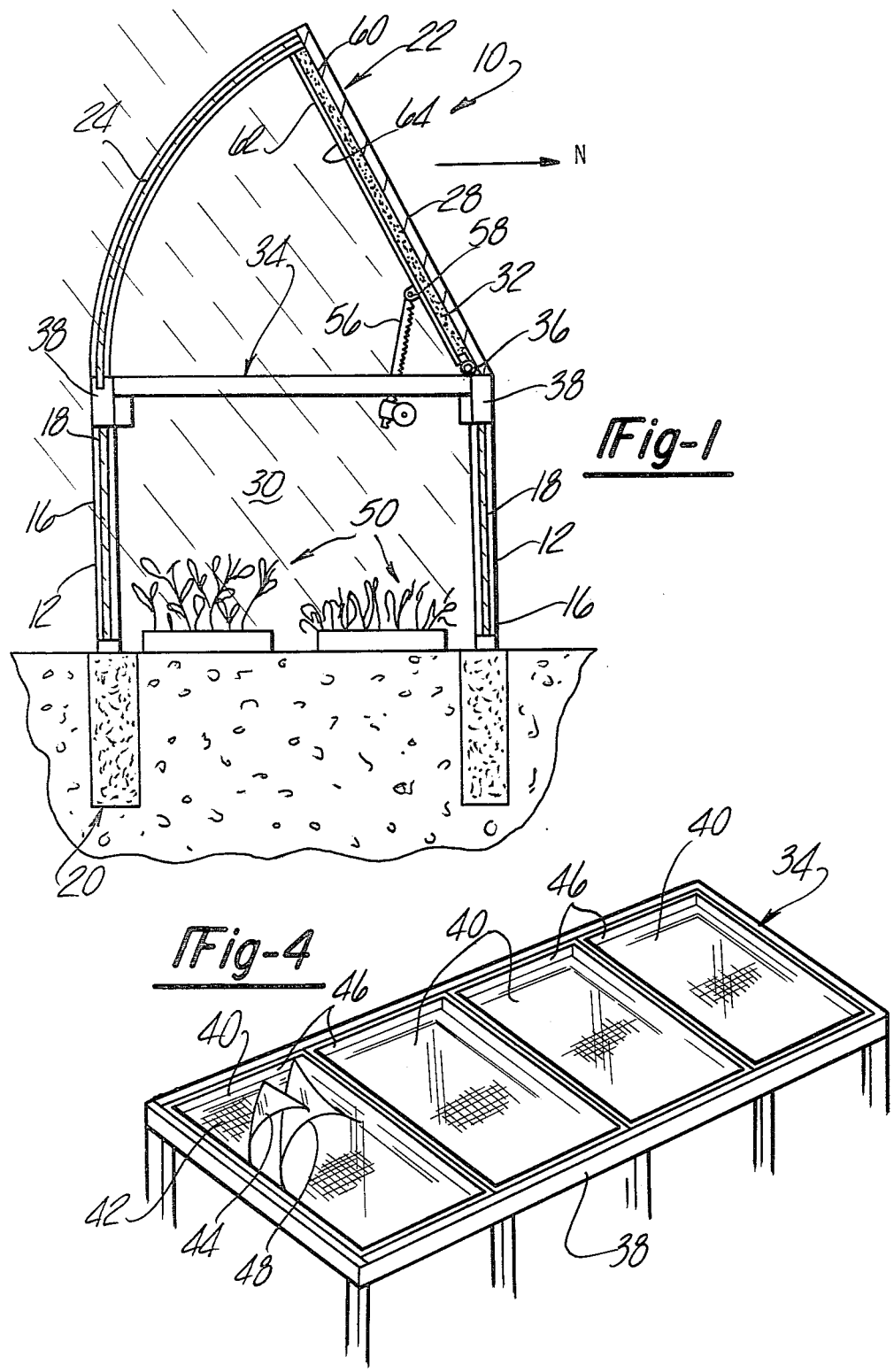

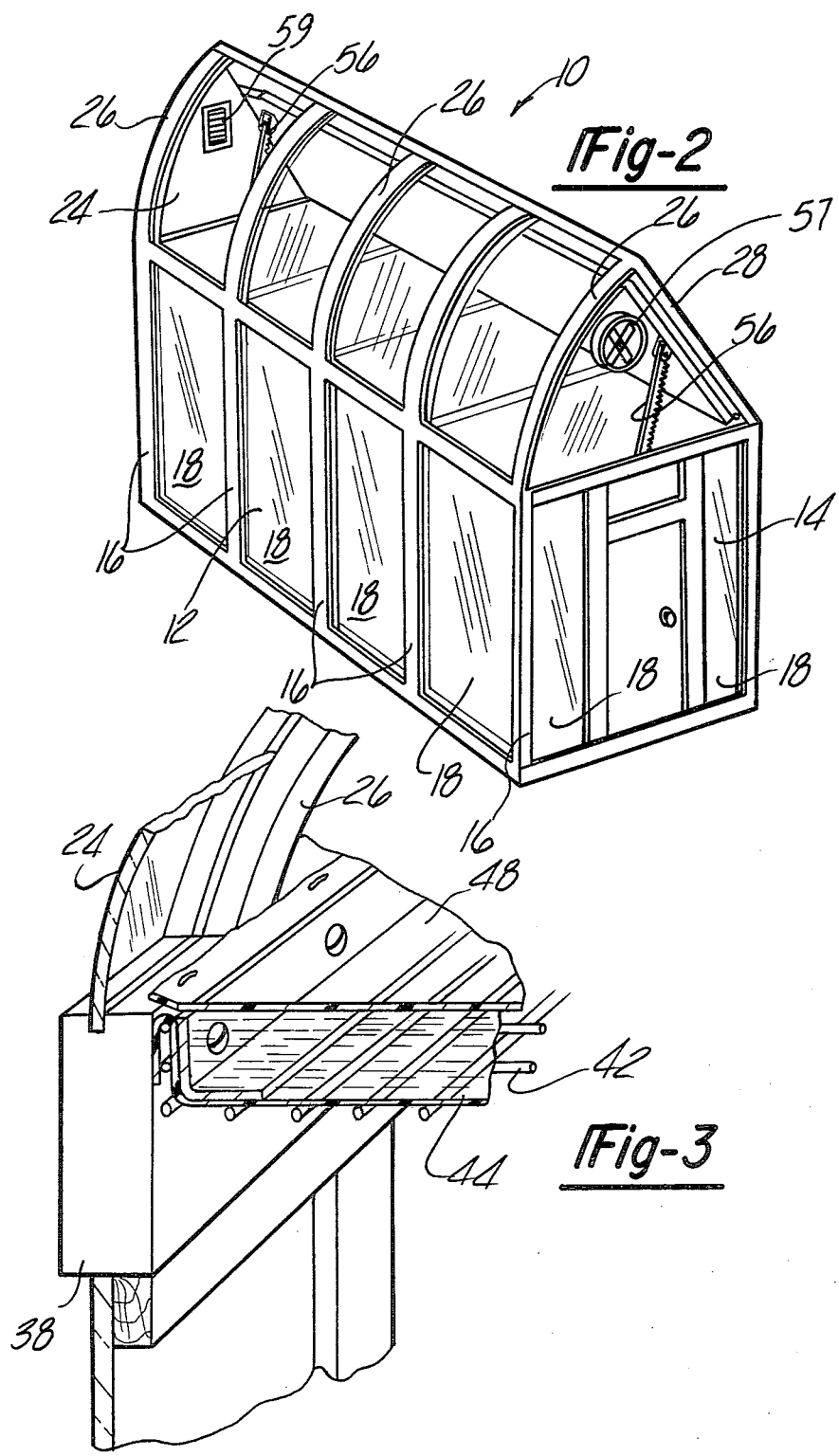

GREENHOUSE AND METHOD OF GROWING PLANTS IN COLD CLIMATES

BACKGROUND DISCUSSION

Conventional greenhouse construction consists of an enclosure defined at least in part by materials such as glass or transparent plastics which will transmit the photosynthetic regions of solar radiation. The interior of the greenhouse is maintained at a suitable temperature by auxiliary heating systems to directly heat the air within the enclosure when the heating effect of the solar radiation is not adequate to maintain the minimum temperature requirements for the particular plants grown within the greenhouse.

The usual materials employed for greenhouse glazing, i.e., glass and relatively thin sheets of plastic, render the structure relatively energy inefficient, inasmuch as the losses during cold weather operation are extremely high due to the poor insulating characteristics of these materials and their relative thinness.

Such energy inefficiency has sharply curtailed the commercial employment of greenhouse farming techniques in cold climates and, with the steadily increasing cost of energy, has greatly reduced the use of greenhouse structures in raising food crops.

During many periods of operation of such greenhouses, the heating effect of the solar radiation exceeds greatly the heat required to maintain the temperature within the enclosure. This heat is normally rejected to the atmosphere by a ventilation arrangement, even during extreme low temperature conditions on bright, sunny days. In any commercial application, the cost of construction of the greenhouse is of course of paramount importance, representing capital investment. While more elaborate heat insulative materials could be utilized, as for example, thermal glass, this would greatly increase the construction costs.

In copending application Ser. No. 967,470, filed Dec. 7, 1978, there is disclosed a structural arrangement for improving the thermal efficiency by reducing the energy requirements of the greenhouse, utilizing a pivotal reflector-insulator member. This member consists of an insulating panel having a reflecting undersurface formed thereon, which panel is positioned in a raised position such as to admit solar radiation into the interior of the greenhouse during daylight conditions, the reflecting undersurface acting to reflect radiation into the interior to augment the direct sunlight. During nighttime or low light conditions, the panel is pivoted into a closed, covering position over the ceiling area of the greenhouse so as to provide insulation and retain the heat accumulated during the daytime.

Soil and gravel thermal storage media is employed absorbing and storing the solar energy which is rendered more feasible by the use of an insulated foundation structure.

During warm seasons, overheating and excessive illumination of the interior is the dominant problem often requiring shielding of the transparent panels forming the greenhouse structure.

It is therefore an object of the present invention to provide a greenhouse structure and method of growing plants under cold weather conditions in which the energy required is greatly reduced to improve the operating efficiency of the structure.

It is a further object of the present invention to more efficiently utilize the solar energy impinging on the structure for the purpose of maintaining minimum temperature variations within the interior of the greenhouse.

It is still a further object of the present invention to provide such high efficiency greenhouse structure with a construction which is relatively low in cost to fabricate such as to render the growing of plants commercially feasible in relatively severe northern climatic zones.

SUMMARY OF THE INVENTION

These and other objects of the present invention, which will become apparent upon a reading of the following specification and claims, are achieved by the use of a water layer disposed such that the impinging solar radiation passes through the layer prior to passing into the interior of the enclosure. The water layer is contiguous to and partially defines the interior of the enclosure, such that the volume of water acts as a thermal storage media. The relatively long wavelength infrared radiation is absorbed in the water while allowing passage of photosynthetic spectral regions of the solar radiation.

The heated water thus acts to radiate and maintain the minimum temperature conditions within the greenhouse, while allowing the photosynthesis to take place in the plant tissues disposed within the growing environment constituted by the interior of the enclosure.

The presence of the water layer sufficiently attenuates transmitted radiation during warm seasons to alleviate the problem of overheating and excessive illumination.

In the preferred embodiment of the invention, the water layer takes the form of ponds positioned over a ceiling of the interior enclosure. Each pond is confined by a reinforcing mesh layer providing structural support for a transparent sheet material such as Mylar or other suitable plastic material. The material is secured to the greenhouse ceiling structural members to define the ponds into which is introduced a volume of water. A second layer of transparent plastic material may be employed to minimize water evaporation, except during periods when overheating is the dominant problem. Evaporative cooling of the water ceiling can be employed during warm periods if the second layer of plastic is not utilized.

Pivotal reflector-insulator panels are also advantageously employed, movable between alternate positions, a first position covering the water layer during periods of low or no sunlight to retain the heat energy absorbed during high sunlight conditions, and a second open position enabling the solar radiation to radiate through the water ceiling into the greenhouse interior. The pivotal reflector-insulator panels are provided with a reflective undersurface which acts to reflect solar radiation into the interior of the greenhouse structure in the raised position.

The water contained in the water ceiling may also be circulated after heating into an irrigation system to enhance the role of water as a thermal storage media.

DESCRIPTION OF THE DRAWINGS

FIG. 1 is a partial perspective view of a greenhouse according to the present invention.

FIG. 2 is a transverse sectional view of the greenhouse shown in elevation depicting the general arrangement of the various structural components of the greenhouse.

FIG. 3 is a fragmentary partially perspective view of the water ceiling component depicted in FIG. 1.

FIG. 4 is a perspective view of the greenhouse ceiling framing structure together with the components forming the water ceiling depicting the transparent plastic layers partially peeled back to reveal the mesh support layer underneath.

DETAILED DESCRIPTION

Figure 5:
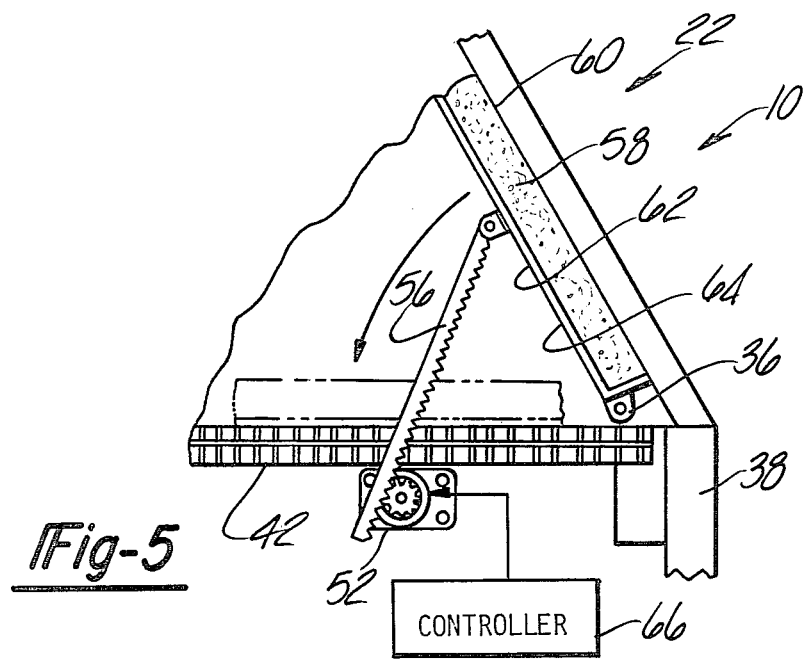
FIG. 5 depicts a pivotal reflector-insulator panel enlarged from an impartial section together with a diagrammatic representation of a motorized actuator for positioning the pivotal reflector-insulator panel in its alternate operative positions.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIGS. 1 and 2, the greenhouse according to the present invention is particularly configured to be oriented along an east-west axis with a southern exposure of one side thereof and which is equipped with a pivotal reflector-insulator panel according to the concept set forth in copending application Ser. No. 967,470, filed Dec. 7, 1978, referred to above.

The concept according to the present invention is also applicable to greenhouses of other types of construction.

The greenhouse 10 depicted consists of a framed structure in which the sidewalls 12 and endwalls 14 are of frame construction consisting of framing members 16, of aluminum or wood suitably joined together to form a wall structure interposed with openings. Into these openings are mounted transparent panels 18 of a glass or acrylic plastic to provide the maximum illumination of the greenhouse interior.

The sidewalls 12 and endwalls 14 are mounted onto a suitable foundation structure indicated at 20 which advantageously may be insulated to prevent the loss of heat through the soil beneath the greenhouse. Since the soil also may act as a thermal storage media, the efficiency in operating the greenhouse 10 may be substantially improved by the use of such insulation of the foundation. Such insulation may be provided by forming the foundation of styrofoam or other foamed plastic, or by lining the concrete foundation wall with an insulating material.

The roof 22 is of an asymmetrical configuration adapted to maximize the solar radiation in the south facing direction of one of the endwalls 14 as indicated in FIG. 1. This also incorporates the pivotal reflector-insulator system according to the above-cross referenced copending application. These adaptations of the particular design depicted in FIGS. 1 and 2 result in the use of curved roof panels 24 on the roof side facing the southern direction, which roof panels 24 may be mounted by the use of suitable framing members 26 of aluminum or other suitable material shaped to support the curved roof panels 24.

Flat back panels 28 form the backside of the roof 22 mounted in the framing members 26 and may also be of opaque material since solar illumination cannot reach the greenhouse interior 30 due to the presence of pivotal reflector-insulator panels 32.

Pivotal reflector-insulator panels 32 are provided movable within the roof 22 interior from a first closed position, in which they extend horizontally over the greenhouse ceiling 34 to a second open position, by being pivoted about a pivot 36 to be flat against the flat back panels 28. In this second position, solar radiation may penetrate the greenhouse interior 30 while the panels provide an insulating function preventing the escape of heat in the first position. These positions are caused to be assumed by the pivotal reflector-insulator panels 32 during daytime and nighttime conditions, respectively.

The curvature of the curved roof panels 24 is selected to provide clearance for the movement of the pivotal reflector-insulator panels 32 moving between the first and second positions.

Ceiling 34 of greenhouse interior 30 includes a framing network consisting of framing members 38 subdividing the ceiling 34 into a grid pattern immediately above the greenhouse sidewalls 12 and endwalls 14.

According to the concept of the present invention, a layer of water is provided extending across the ceiling 34 of the greenhouse in order to provide absorption of the heat energy solar radiation, i.e., the infrared or longer wavelength components of the solar spectrum, while allowing passage therethrough of the photosynthetic shorter wavelengths of the solar spectrum. This enables the heat energy of the solar radiation to be stored in the water layer without interferring with the required illumination of the greenhouse interior for purposes of supporting the plant growth.

This water ceiling is provided in the embodiment described by forming ponds within each respective grid 40 of the framing system network constituted by the framing members 38. Such ponds are advantageously provided by a steel or other material mesh layer 42 providing a structural foundation for a covering layer of clear plastic 44 extending thereover. These are secured to the framing members 38 beneath an angle element 46 fastened to the framing members 38. The water is then introduced into the resulting impoundment and a covering plastic layer 38 is preferably provided during cold weather operation to control and minimize evaporation of the water in the impoundment which would otherwise result in the loss of heat through evaporation and condensation on the transparent panels 18.

The water layer is effective at depths of just a very few inches, i.e., on the order of 1 to 6 inch depths.

Thus, the greenhouse interior 30 defines a growing environment for plants indicated at 50 which may receive solar radiation through the transparent panels 18 and curved roof panels 24 of the ends and sides of the greenhouse.

The radiation passing through the ceiling 34 causes the water layer to be heated by the absorption of the long wavelength infrared radiation. At the same time, the shorter wavelength components of the solar spectrum pass into the greenhouse interior 30 to provide for and support the photosynthetic plant reactions and thus not interfere with plant growth.

At the same time, the excess thermal energy of the solar radiation is effectively stored in the ceiling 34 such that during nighttime or low sunlight conditions, the temperature within the greenhouse interior 30 may be maintained with lesser use of supplemental heat energy than otherwise may be required.

This process is enhanced by the use of the pivotal reflector-insulator panels 32 which are movable from a first to second position as by a system indicated diagrammatically in FIG. 5. A motor 52 rotates a drive pinion 54 cooperating with a rack lever 56, pinned at 58 to the pivotal reflector-insulator panel 32. Each panel 32 is provided with an insulative layer 60 formed atop a reflective layer 62 which has an undersurface 64 of bright metal finish as anodized aluminum, or otherwise reflectorized such as to maximize the illumination directed into the greenhouse interior 30 with the pivotal reflector-insulator panel 32 in its raised position. A suitable automatic control 66 such as a timer, temperature or radiation sensor, etc., may be employed to control energization of the drive motor 52 for rotating the drive pinion 54 and driving the rack lever 56 suitably to either raise or lower the pivotal reflector-insulator panel 32 and maintain it in the first or second of the two alternate positions.

Accordingly, during nighttime or low sunlight conditions, the pivotal reflector-insulator panels 32 will be lowered over the water ceiling such that the loss of heat energy is minimized. This effectively allows utilization of the excess solar energy generated by the solar radiation during daytime hours.

During warm weather operation, the layer attenuates the transmitted radiation sufficiently to alleviate the problem of excessive illumination and overheating. The second layer 38 is preferably removed and, with ventilation of the space above the layer, evaporative cooling can take place by the evaporation of the water in this layer. Such ventilation may be achieved by a ventilation fan 57 drawing air through movable gable vents 59.

The volume of water within the water ceiling may also be employed to advantage in an irrigation system which may be incorporated in the greenhouse 10. This enables the temperature of the water to be raised prior to irrigation by circulation of the water through the ponds forming part of the water ceiling 34 such as to add the thermal energy of the circulated water to the thermal energy stored in the ground or earth within which the plants are grown.

This also avoids the shock to the root system of the plants being grown with cold water irrigation.

Figure 6:
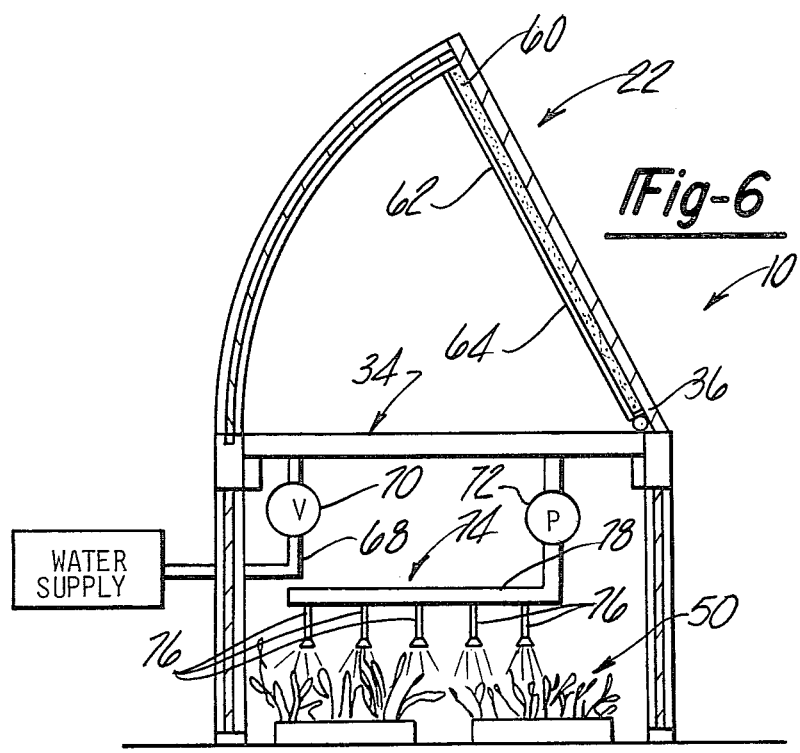
FIG. 6 depicts a diagrammatic form of a greenhouse according to the present invention in transverse section incorporating a system of components for utilizing the heated water from the water ceiling in an irrigation system employed within the greenhouse interior.

This arrangement is depicted diagrammatically in FIG. 6, with a water supply line in communication with the ponds contained within the water ceiling 34, the incoming supply line 68 under the control of a level control valve 70 which acts to maintain the constant level of the respective ponds within the water ceiling 34. An outlet valve 72 is provided, thermostatically operated by conventional thermostatically operated valve or alternatively by a timer for irrigating at predetermined intervals.

The irrigation network is represented by the reference numeral 74, spray nozzles 76 and manifold pipe 78 also indicated, although alternatively other forms of irrigation system may of course be employed such as drip lines, etc.

Accordingly, it can be seen that by this greenhouse construction, the plants may be grown in the greenhouse interior 30 constituting the growing environment by passing the solar radiation through a water layer such as to effectively separate out the primary heating components of the solar spectrum, i.e., the long wavelength radiation from the shorter wavelength portions thereof which constitute the main photosynthetic radiation component. This results in the reduction in direct solar heating of the air within the greenhouse interior 30, and instead carries out a heating of the mass of water contained in the water layer forming and defining a portion of the growing environment enclosure. Water very effectively performs this function and, due to its great capacity for storing heat energy, renders it ideal for use as a thermal storage media, in addition to the means for absorbing the long wavelength radiation from the solar radiation while transmitting the photosynthetic wavelengths thereof.

In addition, the extremely low cost of the water ceiling construction described is in keeping with the requirements of commercial applications and the only materials required are those which are available at relatively modest cost; complex controls, exotic materials or excessive erection labor not being required.

It is understood that many variations of the concept of the present invention are possible from the specific greenhouse configuration depicted, i.e., the greenhouse construction having symmetrical roof structures with or without the pivotal reflector-insulator panels. Other portions of the greenhouse structure could be constructed such as to provide a water layer through which the solar radiation must pass to reach the interior, such as hollow wall panels formed of transparent material and filled with a volume of water to achieve the same end.

It will also be understood by those skilled in the art that many conventional components of greenhouses will be included in typical greenhouses which are not shown here, i.e., the use of auxiliary heating plants to maintain thermal temperature conditions in extreme temperature conditions; ventilation systems which will act to provide a supply of fresh air to insure an adequate oxygen level within the air and eliminate excess heat which penetrates to the interior of the greenhouse; structural details of the framing, etc.

The embodiments of the invention in which an exclusive property or privilege is claimed are defined as follows:

1. A greenhouse consisting of an enclosure defining an interior space within which plants are to be grown, said enclosure including a ceiling portion thereof consisting of a pond of water extending atop said enclosure and means supporting said layer of water, including sheets of a material transparent to those portions of solar radiation supporting photosynthetic processes in plants grown, whereby said water layer acts to absorb the longer wavelength infrared radiation in the solar spectrum while transmitting the photosynthetic component of solar radiation, said water layer also acting as a thermal storage media; and a plurality of pivotal reflector-insulator panels mounted to said greenhouse enclosure to be movable between a first position whereat said panel is positioned immediately over said water pond and a second position tilted above said water pond, and wherein each of said pivotal reflector-insulator panels consists of a panel member and includes an insulating layer, whereby said panel may be positioned over said water during periods of low or no solar radiation to minimize heat losses from said water pond to the exterior of said greenhouse.

2. The greenhouse according to claim 1 wherein said water ceiling includes a layer of mesh, with a transparent plastic layer disposed over said mesh to form an impoundment to provide said pond of water.

3. The greenhouse according to claim 2 further including a plastic layer extending over the upper surface of said pond of water, whereby evaporation of said water in said pond is eliminated.

4. The greenhouse according to claim 1 further including means for circulating said water in said water layer out of said water layer after heating thereof by solar radiation and wherein said greenhouse further includes an irrigation network and means for causing said heated water in said water layer to be circulated into said greenhouse irrigation system.

5. A method of growing plants in cold climates consisting of the steps of:

enclosing said plants in an enclosure, said enclosure including a ceiling portion thereof defined in part by a water pond and an underlying supporting layer transmissive of photosynthetic radiation components;

circulating an air flow over said water pond during warm weather to provide evaporative cooling of said enclosure;

whereby solar radiation passing through said water layer heats said water by absorption of said longer wavelength components of solar radiation while allowing penetration to the interior of said enclosure of components of solar radiation supporting said plant growth within said enclosure, said water layer thereby acting to absorb heat energy and to act as a thermal storage media.

6. The method according to claim 5 further including the step of positioning an insulating layer over said water ceiling during periods of low solar radiation, whereby loss of said heat stored in said water ceiling is not lost to the exterior.

7. The method according to claim 6 further including the step of disposing a transparent layer of material over said water layer which is transmissive of said photosynthetic region component of solar radiation, whereby evaporative losses from said water layer are eliminated.

8. The method according to claim 5 further including the step of circulating warmed water from said water layer to irrigate said plants growing within said interior.

* * * * *